(12) United States Patent
Knight

(10) Patent No.: US 10,817,922 B2
(45) Date of Patent: *Oct. 27, 2020

(54) PERSONA FOR OPAQUE TRAVEL ITEM SELECTION

(71) Applicant: Expedia, Inc., Bellevue, WA (US)

(72) Inventor: Matthew James Knight, Walnut Creek, CA (US)

(73) Assignee: Expedia, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,335

(22) Filed: Sep. 24, 2018

(65) Prior Publication Data

US 2019/0057429 A1 Feb. 21, 2019

Related U.S. Application Data

(63) Continuation of application No. 14/576,087, filed on Dec. 18, 2014, now Pat. No. 10,083,474.

(51) Int. Cl.
*G06Q 30/00* (2012.01)
*G06Q 30/06* (2012.01)
(Continued)

(52) U.S. Cl.
CPC ....... *G06Q 30/0627* (2013.01); *G06F 16/248* (2019.01); *G06F 16/2457* (2019.01);
(Continued)

(58) Field of Classification Search
None
See application file for complete search history.

(56) References Cited

U.S. PATENT DOCUMENTS 8,458,021 B1 * 6/2013 Bous .................. G06Q 30/0635
705/14.1
9,406,091 B1 8/2016 Lopez
(Continued)

FOREIGN PATENT DOCUMENTS

WO WO 2014/149513 9/2014

OTHER PUBLICATIONS

Schmeing, Tobias, Knowledge-based Dynamic Packaging Model, Dec. 26, 2006, Management of Innovation and Technology, 2006 IEEE International Conference, pp. 1085-1089 (Year: 2006).*

(Continued)

*Primary Examiner* — Michael Misiaszek
*Assistant Examiner* — Timothy J Kang
(74) *Attorney, Agent, or Firm* — Knobbe Martens Olson & Bear LLP

(57) ABSTRACT

A network-based service may be provided for facilitating queries for a number of items, such as travel services. A user may submit a query including criteria for determining relevant items. The network-based service may be configured to generate opaque search results in response to queries, revealing sufficient detail to allow the user to confirm the relevance of the travel item, but insufficient detail to disclose the identity of the supplier. Based on the submitted query or other information, the network-based service may associate a persona with the user, such as the persona of a business or leisure traveler. The network-based service may use the persona to determine a travel item or items best suited to the user, by identifying the travel item attributes that correlate positively with preferences of the persona. The network-based service may then generate an opaque search result that reveals travel item attributes desired by the persona.

20 Claims, 7 Drawing Sheets

(51) Int. Cl.
  *G06F 16/95* (2019.01)
  *G06F 16/248* (2019.01)
  *G06F 16/2457* (2019.01)
  *G06Q 50/12* (2012.01)

(52) U.S. Cl.
  CPC ......... *G06F 16/95* (2019.01); *G06Q 30/0629* (2013.01); *G06Q 30/0641* (2013.01); *G06Q 50/12* (2013.01)

(56) References Cited

U.S. PATENT DOCUMENTS

| | | | |
|---|---|---|---|
| 10,049,397 B1* | 8/2018 | Patankar | ............ G06Q 30/0631 |
| 2002/0147715 A1 | 10/2002 | Beyer | |
| 2003/0191725 A1 | 10/2003 | Ratliff et al. | |
| 2006/0155598 A1 | 7/2006 | Spurr et al. | |
| 2008/0201227 A1 | 8/2008 | Bakewell et al. | |
| 2010/0262482 A1 | 10/2010 | Bous | |
| 2011/0224864 A1 | 9/2011 | Gellatly et al. | |
| 2013/0218687 A1 | 8/2013 | Sohangir et al. | |
| 2014/0095224 A1 | 4/2014 | Vernitsky | |
| 2014/0129372 A1* | 5/2014 | Kalnsay | ............ G06Q 30/0631 705/26.7 |
| 2014/0365315 A1 | 12/2014 | Laadan | |

OTHER PUBLICATIONS

Schmeing, Tobias, Knowledge-based Dynamic Packaging Model, Dec. 26, 2006, Management of Innovation and Technology, 2006 IEEE International Conference, pp. 1085-1089.

International Search Report and Written Opinion dated Mar. 3, 2016, issued in corresponding PCT/US2015/061660.

International Preliminary Report on Patentability dated Jun. 20, 2017, issued in corresponding PCT/US2015/061660.

* cited by examiner

PERSONA FOR OPAQUE TRAVEL ITEM SELECTION

CROSS-REFERENCE TO RELATED APPLICATIONS

This application is a continuation of U.S. patent application Ser. No. 14/576,087, entitled PERSONA FOR OPAQUE TRAVEL ITEM SELECTION, and filed Dec. 18, 2014, now U.S. Pat. No. 10,083,474, issued Sep. 25, 2018, the entirety of which is incorporated herein by reference.

BACKGROUND

Computing devices and computing networks are frequently employed by users to obtain information and to make purchases. For example, a user may search for, review, and share information regarding items of interest from a network-based information service using his or her personal computing device. In another example, a user may purchase an item of interest from a network-based retailer using his or her personal computing device. Furthermore, network-based services may enable a user to perform these tasks in the comfort of their home or office and at their own pace and convenience.

In some instances, network-based services may provide information regarding a variety of items offered from a variety of sources. For example, a network-based travel service may offer flights, accommodations (e.g., hotels, bed and breakfasts, hostels, resorts, etc.), ground transportation (car rentals, taxis, town cars, trains, shuttles, etc.), or other travel items from a variety of airlines, accommodation providers, rental companies, etc. Further, inventory of each item may be highly volatile, such that the availability of any given travel item (e.g., a specific flight or hotel room) may be altered within a very short time period. In addition, multiple items may be available that meet a user's criteria (e.g., multiple flights or flight combinations to a given destination, multiple hotel rooms within a given city, etc.).

Moreover, in some instances, a network-based travel service may respond to a travel item query by providing opaque search listings. The service provides opaque listings when it withholds the identity of a travel item supplier (or information expected to reveal the identity of the travel item supplier), and then reveals the supplier's identity only after the user purchases the travel item corresponding to the opaque listing. Common examples of opaque listings for travel items include "secret" hotels and airfares. A network-based travel service may disclose, for example, only that the offered travel item is a four-star hotel near a major airport, or is an economy-class airfare to a major city, without providing the name of the hotel or airline. The service may also refrain from providing specific details, such as the hotel address or the flight departure time, that would allow the user to identify the supplier indirectly. The use of opaque search results may allow suppliers to sell excess travel item inventory while minimizing impact on traditional sales. However, due to the opacity, the purchaser of an opaque travel item may not know in advance whether the item will satisfy their travel requirements.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
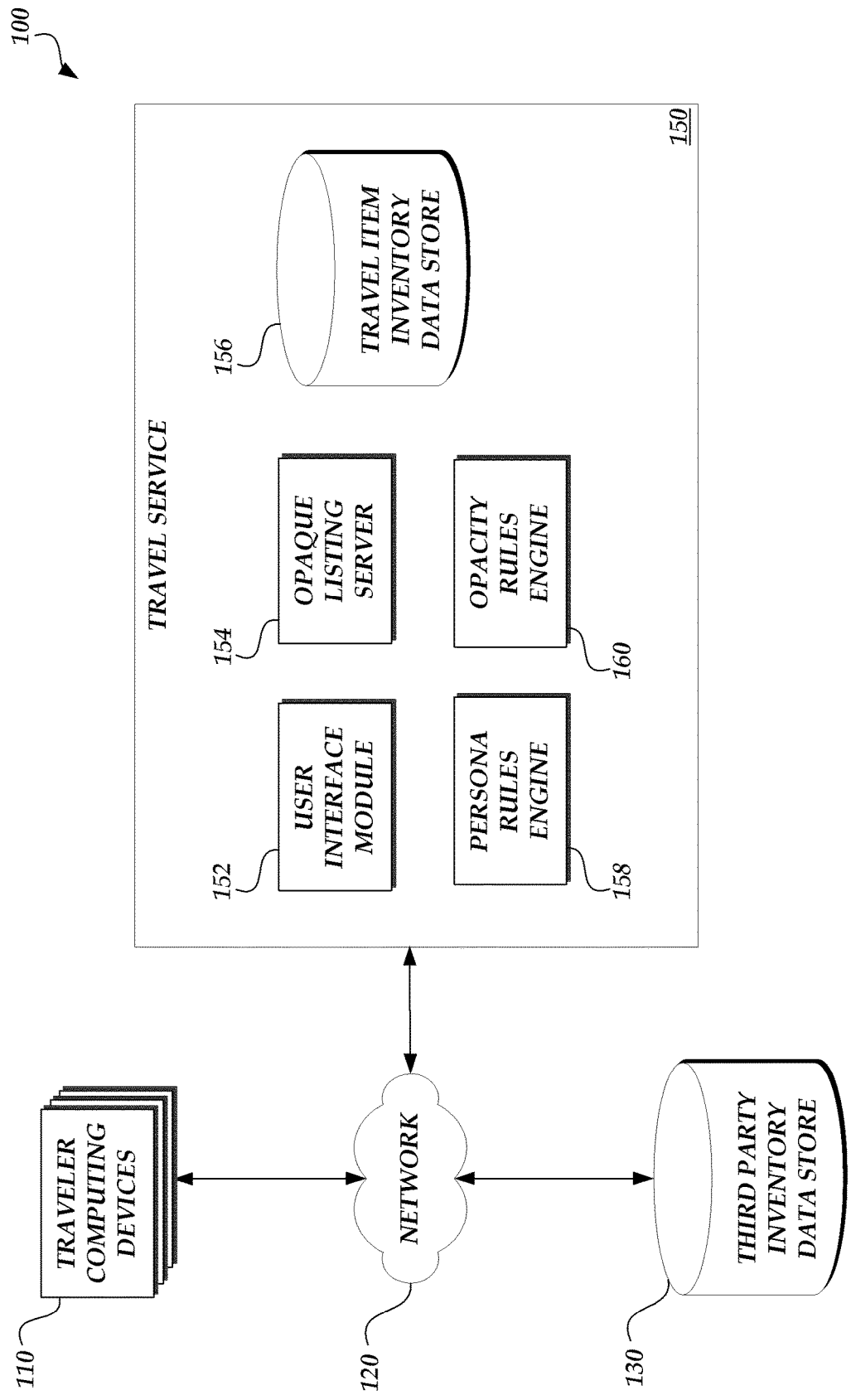
FIG. 1 is a schematic block diagram of an illustrative network environment in which a travel service may operate to deliver opaque search results based on a travel item query and a user persona.

Generally described, aspects of the present disclosure are directed to managing queries for travel items offered or provided via network-based travel services. More specifically, aspects of the present disclosure relate to facilitating the generation of opaque search results based on a travel item query and a user persona. Generally described, a user persona may reflect a user's intent when purchasing a travel item. Examples of personas include, but are not limited to, business travelers, leisure travelers, family vacationers, economy travelers, etc. Illustratively, a network-based travel service may offer one or more travel items for acquisition, purchase, or booking. Travel items may include items such as flights, hotels or other accommodations, ground transport, activities, etc. The network-based travel service provides opaque search results based on these travel items, disclosing only limited information about the travel items in order to preserve the anonymity of the supplier. A user of the network-based travel service may submit a search query for a travel item. The search query may include criteria for selecting relevant travel items (e.g., a relevant flight, hotel, rental car, etc.). Thereafter, the service may return available and relevant travel items after making search results opaque by removing information that would permit the user to identify the supplier.

In accordance with embodiments of the present disclosure, the service may determine which travel items are relevant based at least in part on a persona associated with the user. For example, a user may explicitly indicate in a travel item query that the user is traveling on business. The travel service may, based on this indication, determine that the most relevant search results are accommodations providing amenities suitable for business travelers, such as a business center or fitness center. Thereafter, the travel service may return a list of opaque results that are relevant to the user persona, and in addition may return a list of opaque results selected without regard for the user persona. Further, when making the search results opaque, the travel service may determine what information to disclose about a travel item based at least in part on the user persona. For example, the service may determine that a "family vacation" persona includes a preference for hotels located near tourist attractions, and on that basis may disclose that a particular hotel is within walking distance of, e.g., a museum or theme park. As will be described in more detail below, the disclosed information may also be selected to maintain the anonymity of the opaque listing's supplier prior to purchase.

Embodiments of the present application may utilize a network-based travel service, which provides information regarding available travel items from a plurality of travel item providers, without revealing the identities of suppliers prior to purchase. Illustratively, a user may submit a query for accommodation in City A on a given date to the network-based travel service. Thereafter, the service may identify a set of available travel items based on the user's query, generate a list of opaque search results based on these available travel items, and return the list of opaque search results to the user for selection. In some instances, the user may prefer accommodations that offer particular features or amenities. However, the network-based travel service may be unable to disclose specific attributes of the travel item without indirectly disclosing the identity of the supplier. For example, there may only be one hotel located within ten minutes of a particular city center that provides a fitness center, a spa, and wireless internet access. Disclosing these attributes would thus allow the user to identify the supplier indirectly. Similarly, the service may be unable to permit the user to specify individual attributes in a search query without exposing the identity of the supplier. Using the hotel of the previous example, if the user search criteria specified only hotels within ten minutes of a city center that provided a fitness center, a spa, and wireless internet access, only one hotel would match the criteria. Returning a single opaque search result would thus indirectly disclose the identity of the supplier, regardless of which attributes the travel service actually disclosed.

Accordingly, it may be desirable to enable a user to express a preference for accommodations that offer particular groups of attributes, without enabling the user to specify individual attributes and thereby discover the identity of the supplier. For example, a network-based travel service may provide the user an option to bias the search in favor of family-friendly accommodations, where a family-friendly accommodation is defined as one that has a swimming pool, proximity to tourist attractions, and free wireless internet access. This bias may be introduced in the form of a user persona, which embodies a non-user-specific set of preferences for various travel item attributes. A user's past travel purchases, travel search history, and other profile information of the user may be examined to determine a relevant persona. In some embodiments, the network-based travel service may utilize a persona to create a customized search, the terms of which may be invisible to the user, and thereafter perform the customized search to locate travel items of interest to the user. Further, a search result may disclose certain features of an accommodation based in part on the user's preference for accommodations providing these attributes. For example, when facilitating a search query using a "family vacation" persona, the service may disclose that an opaque listing is located in proximity to local theme parks and attractions.

In some embodiments, the network-based travel service may determine a persona to be assigned to a user search query based on explicit instructions from the user, such as the user selecting a persona when creating a travel item query. In other embodiments, the travel service may determine a persona to be assigned to a user search query indirectly, such as by analyzing previous search queries of the user, travel histories of the user, or web browsing activities of the user. For example, the travel service may analyze web server logs to detect that a user tends to click links for business hotels, and subsequently associate a business persona to queries of the user, thereafter providing search results to the user that are based on the business persona. Further, as will be described in more detail below, the travel service may associate multiple personas to a user, or may dynamically generate a persona based on information about the querying user and other users with similar characteristics.

Embodiments of the present disclosure may maintain a set of weighting factors for each persona, which represent and correspond to the preferences of the persona. For example, a "business" persona may include a strong interest in accommodations with a business center and internet access, a mild interest in accommodations with a fitness center and swimming pool, and a low interest in accommodations with free parking and proximity to tourist attractions. In some embodiments, these weighting factors may be predetermined (e.g., manually established by an operator of the travel service). The service may quantify these weighting factors in buckets (e.g., high, medium or low) or on a numeric scale. Illustratively, the service may assign determined weights associated with a specific persona to attributes of available travel items, such as the quality of service associated with the travel item, amenities provided by the travel item, ratings of the travel item, or the location of the travel item relative to other travel items purchased by the user. The travel service may further assign weighting factors for each persona based on an accommodation's proximity to, for example, transit hubs, urban areas, business centers, public parks, museums, theme parks, convention centers, sports arenas, tourist attractions, or other landmarks. Still further, the travel service may exclude certain attributes, such as an accommodation's price or its class of service, from the weighting factors for a persona. The travel service may use the weighting factors associated with a persona to determine whether an available travel item is more likely or less likely to satisfy a user search query, and may thus use the weighting factors to provide more relevant travel items when returning opaque search results. To preserve the opacity of search results, the travel service may avoid disclosing the weighting factors that were used to determine relevant travel items. The travel service may disclose, for example, that a "vacation" persona was used to determine relevant travel items, but not that the "vacation" persona applied a high weighting factor to accommodations with swimming pools. The user's ability to assess the relevance of the opaque search results, and in particular to identify the suppliers of travel items, may thus be limited.

In other embodiments, the travel service may determine weighting factors for personas dynamically, based on analyses of the activities of multiple users. For example, the travel service may analyze recent hotel selections by travelers to a resort destination, determine that a leisure travel persona should be associated with these travelers, and further determine that a leisure traveler persona represents an aggregate preference of these travelers for hotels with a spa and an aggregate indifference of these travelers to whether a hotel has a conference center. Illustratively, the travel service may analyze data such as travel item purchases, search queries, hotel occupancy rates, and traveler reviews by multiple users corresponding to a persona to dynamically determine a persona's weighting factors based on aggregated activity of a plurality of travelers corresponding to the persona. The travel service may further analyze the activities of multiple users to dynamically determine the personas themselves based on patterns or clusters of user behaviors. For example, the travel service may dynamically identify a "spring break" persona by detecting similarities in the travel item purchases of adults age 18 to 25 in the months of March and April.

In some embodiments, the network-based travel service may analyze ratings of a travel item, determine that particular sets of ratings are more relevant or less relevant to a specified user persona, and determine weighting factors for the user persona based on the relevance of the sets of ratings. Generally described, ratings are feedback about a travel item. Past travelers may explicitly provide such feedback, or the travel service may infer ratings based on data such as travel item popularity, repeat consumers, customer service interactions, or data from other sources. A rating may be expressed, for example, on a numeric scale, as a number of stars or other symbols, as an either-or selection, as a written essay, or as an audio-visual presentation. Illustratively, the travel service may analyze ratings for an accommodation and determine that sets of ratings correspond to user persona. For example, an accommodation that is inexpensive, inconveniently located, and provides some amenities for business travelers may receive high ratings from one group of travelers, low ratings from a second group of travelers, and average ratings from a third group travelers. The travel service may determine that these groups of travelers correspond to a budget-conscious persona, a leisure traveler persona, and a business traveler persona. The network-based travel service may further determine that, for example, the leisure traveler persona should apply a strong weighting factor to ratings from other leisure travelers, a weak weighting factor to ratings from budget-conscious travelers, and should disregard ratings from business travelers. The travel service may then apply weighting factors accordingly, making it less likely that the travel service will recommend the accommodation in question to users associated with a leisure traveler persona.

In accordance with embodiments of the present disclosure, a network-based travel service may generate opaque search results that vary in opacity and price based at least in part on the user persona. Illustratively, a user associated with a business persona may consider a fitness center to be a key factor when choosing accommodation. The user may thus be willing to spend more to ensure that an opaque travel item has a fitness center, while still spending less than the cost of booking an accommodation through a traditional sales channel. The user may therefore select a higher-priced opaque search result that discloses a fitness center, instead of selecting an opaque search result that is less expensive but more opaque (i.e., one that does not disclose whether the accommodation has a fitness center). As a further example, a network-based travel service may provide a leisure traveler with opaque search results containing three accommodation choices, the first of which discloses that it provides a spa. In actuality both the first and second accommodation provide a spa, and only the third accommodation does not. The user may be willing to pay for certainty that the accommodation will have the desired amenity, and may opt to pay a higher price for the first choice in order to ensure that the accommodation will have a spa. In a further embodiment, the travel service may generate one or more opaque search results based on a single travel item, with each result disclosing a different set of attributes and being priced according to the specific set of attributes disclosed. In this embodiment, multiple opaque search results may be created based on the same travel item.

In some embodiments, a network-based travel service determines a maximal set of attributes of a travel item that can be disclosed within an opaque search result while preserving a desired level of opacity for the corresponding travel item. Illustratively, the travel service may have an inventory of four "three-star" hotels in a particular area. All four hotels may provide a fitness center, swimming pool, free parking, and an on-site restaurant. In addition, Hotel A may provide an airport shuttle service and a spa, Hotels B and C may provide complimentary internet access, and Hotel D may provide both a spa and complimentary internet access. An opaque listing that disclosed, for example, that the accommodation provided an airport shuttle would thus allow a user to identify the travel item as Hotel A, since Hotel A is the only one of the four with an airport shuttle service. The travel service may therefore determine that the airport shuttle service of Hotel A cannot be disclosed. The travel service may further determine that attributes can be disclosed even if such disclosures reduce the degree of anonymity, provided that the user still cannot uniquely identify the supplier. For example, an opaque listing that discloses a spa may allow the user to rule out the possibility that the accommodation is Hotel B or C, but does not allow a user to definitively identify the travel item as Hotel A, since Hotel D also provides a spa. The travel service may therefore determine that the spa feature of Hotel A can be disclosed. However, the travel service may determine that it cannot disclose both the spa feature and the complimentary internet access feature of Hotel D, since disclosing both attributes would rule out all three of the other hotels.

Further, in some embodiments, the travel service may determine the degree of anonymity in an opaque search result based on the preferences of the user persona. For example, if the user has selected a leisure persona, and the leisure persona places a high value on spa amenities, the network-based travel service may permit a lesser degree of anonymity in order to disclose that the opaque travel item provides a spa. Alternatively, the network-based travel service may transmit, for example, an indication that one or more displayed opaque search results are recommended for leisure travelers, thus implicitly signaling that opaque search results in that set are more likely to provide a spa, without explicitly disclosing that any given opaque search result corresponds to a travel item providing a spa.

A network-based travel service may further output multiple sets of opaque search results, each corresponding to a specific persona. For example, a service may output a first set of opaque search results selected based on a business traveler persona, and a second set of opaque search results selected based on an economy traveler persona. In some embodiments, the same opaque search result may appear in both the first set and the second set. In other embodiments, the travel service may generate multiple opaque search results based on a single travel item, and each set of recommendations may include these results.

Still further, a network-based travel service may output a set of opaque search results based on a combination of personas. Illustratively, a travel service may associate a user query with both a leisure travel persona and an economy travel persona, and may output a set of opaque results selected based on the combined weighting factors of the leisure and economy personas. The travel service may further apply the weighting factors of each persona in proportion to their degree of association with the user query. For example, the travel service 150 may determine, based on a travel history, that a user's hotel selections are consistent with those of a business traveler persona 80% of the time, and consistent with a budget traveler persona 20% of the time. The travel service may therefore apply the weighting factors of the business persona and the budget persona in an 80%/20% proportion to output a set of relevant opaque results for the user.

Though described herein with respect to specific types of travel services, embodiments of the present disclosure may be applied to any travel item, including but not limited to flights, accommodations, other transportation, activities, tours, travel insurance, day trips, or destination services. Moreover, aspects of the present disclosure may be applied with respect to other item queries, and should not be construed to be limited to travel services unless explicitly stated otherwise.

Moreover, though illustrative examples are provided herein with regard to presenting opaque travel item recommendations to a user, aspects of the present disclosure may be applied to any network-based travel service that generates a set of opaque search results, and should not be construed to be limited to travel services that present information or make recommendations to users. For example, a travel item search aggregator (e.g., a service which aggregates travel item information from a variety of travel item service providers) may query a network-based travel service, and the service may respond by transmitting a list of opaque query results to the aggregator, with any user presentation occurring in the context of the aggregator. As a further example, a network-based travel service may transmit lists of opaque travel items in response to inputs other than travel item search queries, such as a user requesting a web page or a travel agent requesting a list of popular items.

FIG. 1 is a block diagram depicting an illustrative operating environment in which a network-based travel service 150 enables customers to view opaque search results and acquire corresponding travel items made available by third party providers or the operator of the travel service 150. As illustrated in FIG. 1, the operating environment includes one or more traveler computing devices 110 in communication with a network-based travel service 150 via a network 120. A third party provider may make an inventory data store 130 containing travel items, or information regarding travel items, available to the travel service 150 via the network 120. Illustratively, the inventory data store 130 may correspond to a global distribution system (GDS), computerized reservation system (CRS), or inventory system of a travel item supplier. The travel service 150 may then use the third party travel items, as well as travel items from its own inventory data store 156, to generate opaque listings for travel items. Accordingly, a user, using a traveler computing device 110, may browse the opaque travel item listings available from the travel service 150, search for travel items and receive opaque search results, and acquire, reserve, or book one or more desired travel items (e.g., as represented by an opaque search result), after which the travel service 150 reveals the identity of the travel item supplier.

A traveler computing device 110 may be any computing device, such as a laptop or tablet computer, personal computer, server, personal digital assistant (PDA), hybrid PDA/mobile phone, mobile phone, electronic book reader, set top box, camera, digital media player, and the like. The third party inventory data store 130 and traveler computing devices 110 may communicate with the travel service 150 via a network 120. Those skilled in the art will appreciate that the network 120 may be any wired network, wireless network or combination thereof. In addition, the network 120 may be a personal area network, local area network, wide area network, cable network, satellite network, cellular telephone network, or combination thereof. In the illustrated embodiment, the network 120 is the Internet. Protocols and components for communicating via the Internet or any of the other aforementioned types of communication networks are well known to those skilled in the art of computer communications and thus need not be described in more detail herein. Those skilled in the art will further appreciate that the traveler computing devices 110 of FIG. 1 illustrate a particular embodiment, and that the travel service 150 may communicate, for example, via telephone or through a third-party travel agent.

In the illustrated embodiment, the travel service 150 may be a computer environment including several computer systems that are interconnected using one or more networks. More specifically, the travel service 150 may include a user interface module 152, an opaque listing server 154, a travel item inventory data store 156, a persona rules engine 158, and an opacity rules engine 160. However, it will be appreciated by those skilled in the art that the travel service 150 could have fewer or greater components than are illustrated in FIG. 1. In addition, the travel service 150 could include various web services and/or peer-to-peer network configurations. Additionally, in some embodiments, the travel service 150 may be implemented by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. Thus, the depiction of the travel service 150 in FIG. 1 should be taken as illustrative and not limiting to the present disclosure.

The user interface module 152 may facilitate searching, browsing, and acquisition (e.g., by reservation, booking, etc.) of opaque listings of travel items by users via traveler computing devices 110. In some embodiments, the user interface module 152 may include a web server for generation of webpages facilitating such searching, browsing, and acquisition. Examples of a user interface that may be generated by the user interface module 152 will be described in more detail in FIGS. 3A-3B, below.

In some embodiments, the user interface module 152 may store a predefined, manually created list of personas. Alternatively, in some embodiments, the user interface module 152 may interact with a persona rules engine 158 to acquire, store, and maintain persona information. For example, the user interface module 152 may request a list of available personas from the persona rules engine 158. As described in detail below, the persona rules engine 158 may generate lists of personas based on analyses of data from multiple users of the travel service. Illustratively, the user interface module 152 may transmit persona information to traveler computing devices 110 via the network 120.

The travel service 150 may further include an opaque listing server 154 configured to process queries for opaque listings of travel items, interact with a travel item inventory data store 156 to retrieve relevant travel items in response to the query, and generate and display opaque listings of the relevant travel items to a user. The travel item inventory data store 156 may correspond to any persistent or substantially persistent data store, such as one or more hard disk drives (HDDs), solid state drives (SSDs), or network attached storage devices (NASs). The travel item inventory data store 156 may store information regarding travel items, such as a hotel's geographic location, quality of service, room rates, amenities, proximity to local points of interest, the quantity and type of rooms available on a given date, etc. The opaque listing server 154 may retrieve items from the travel item inventory data store 156 based on any of these criteria. The opaque listing server 154 may be further configured to interface with a third party inventory data store 130 via the network 120. Like the travel item inventory data store 156, the third party inventory data store 130 may correspond to any persistent or substantially persistent data store, and may store similar information regarding travel items. Although not shown in FIG. 1, the opaque listing server 154 may be configured to interface with multiple third party inventory data stores 130.

Still further, the travel service 150 may include a persona rules engine 158 configured to determine a persona for a user, determine a set of weighting factors corresponding to the persona, and return these weighting factors in response to a request to provide them. The persona rules engine 158 may be configured to determine a persona for a specific user based at least in part on information about the user. Such information may include the user's prior search queries, web browsing behavior, travel histories, current destination, characteristics of the search query, or other relevant data. Illustratively, the persona rules engine 158 may compare information about the user to information about other users who have been associated with personas. For example, a user may perform a search query for hotels without providing a self-identified persona. By comparing the details of the user's search to searches performed by previous users who have been associated with personas, the persona rules engine 158 may determine a persona to associate with the user. The previous users may have self-identified as adopting a particular persona, or may have been associated with personas through previous determinations of the persona rules engine 158. Illustratively, the user may, without supplying a self-identified persona, search for weekend travel to a popular resort destination. The persona rules engine 158 may compare the user's search to previous searches by previous users, and may determine through analysis that other users making similar searches typically self-identify with the "leisure traveler" persona. The persona rules engine 158 may therefore determine that the "leisure traveler" persona should be associated with the user.

The persona rules engine 158 may be further configured to determine and return a set of weighting factors corresponding to a persona. The weighting factors corresponding to each persona may be predetermined, or may be determined dynamically based at least in part on analyses of multiple travelers associated with the persona. As an example of the latter, the persona rules engine 158 may analyze the travel histories of users associated with the "leisure travel" persona who travel to a particular destination, and may identify that these users tend to select hotels near the ocean with a swimming pool and a spa. The persona rules engine 158 may further identify that these users show only a slight preference for hotel attributes such as free parking and a fitness center, and that attributes such as a conference center have no relation to the hotel selections of this group of users. The persona rules engine 158 may thus dynamically determine a set of weighting factors in accordance with these identified preferences. The persona rules engine 158 may further use an iterative, machine-learning process to dynamically update the weighting factors corresponding to the persona.

Still further, the persona rules engine 158 may use an iterative, machine-learning process to dynamically update the users and the weighting factors associated with a persona. For example, the persona rules engine 158 may analyze a set of users purchasing accommodations during the work week near a major transit hub, may determine that these users correspond to a "business travel" persona, and may update the weighting factors of the "business travel" persona to include the preferences of the newly identified users. The persona rules engine 158 may analyze users of both opaque and traditional travel services to dynamically update the users and weighting factors associated with a persona.

Illustratively, the weighting factors returned by the persona rules engine 158 may be used (e.g., by the opaque listing server 154) to identify a hotel whose attributes correlate positively with the weighting factors. For example, the weighting factors corresponding to a "family vacation" persona may indicate a strong positive preference for hotels near a theme park, a weak positive preference for free parking, and a strong negative preference for hotels near an airport. These weighting factors may be used to determine that the attributes of a hotel (e.g., one with free parking near a theme park) correlate positively with the preferences of the "family vacation" persona, that the attributes of a different hotel (e.g., one with free parking near an airport) are a mix of positive and negative correlations that sum to a net negative, and accordingly that the former hotel is more relevant to the persona.

The weighting factors determined by the persona rules engine 158 may be in the form of numerical scores, mathematical formulas, ranking "buckets" (e.g., high, medium, and low), conditionals, or other rules for preferring one travel item to another. Though not shown in FIG. 1, the persona rules engine 158 may further store sets of persona weighting factors in a data store.

With continued reference to FIG. 1, the travel service 150 may further include an opacity rules engine 160 configured to generate a set of disclosable attributes for one or more travel items. As will be described below, the opacity rules engine 160 may determine, for a given travel item, a set of travel item attributes to disclose to the user, based at least in part on whether revealing the attributes would enable the user to readily identify the supplier of the travel item. For example, the opacity rules engine 160 may determine that a four-star hotel in a particular geographic area is the only one in its class offering a particular set of amenities (e.g., a complimentary breakfast, a spa, a fitness center, and a complimentary airport shuttle). The opacity rules engine 160 may further determine that a second four-star hotel in the same area offers a second set of amenities that overlaps the first (e.g., wireless internet access, a spa, and a fitness center). Since both hotels offer the spa and fitness center attributes, the rules engine 160 may determine that disclosing the spa and the fitness center within an opaque listing of the first hotel will not reveal the identity of the first hotel. In some embodiments, the opacity rules engine 160 may pre-determine a set of attributes that can be disclosed within an opaque listing for each travel item in the travel item inventory data store 156. Alternatively, the opacity rules engine 160 may determine the set of attributes that can be disclosed within an opaque listing of each travel item at the time of a user's query (e.g., based at least in part on the other travel items in a set of query results).

The opacity rules engine 160 may further be configured to generate a set of disclosable attributes based at least in part on a persona associated with a search query. For example, the opacity rules engine 160 may receive weighting factors from the persona rules engine 158 that indicate a strong preference for an accommodation with a restaurant on premises. The opacity rules engine 160 may subsequently indicate that an accommodation's on-premises restaurant can be disclosed, even if disclosing this attribute narrows the list of possible suppliers or indirectly discloses the supplier.

Figure 2A:
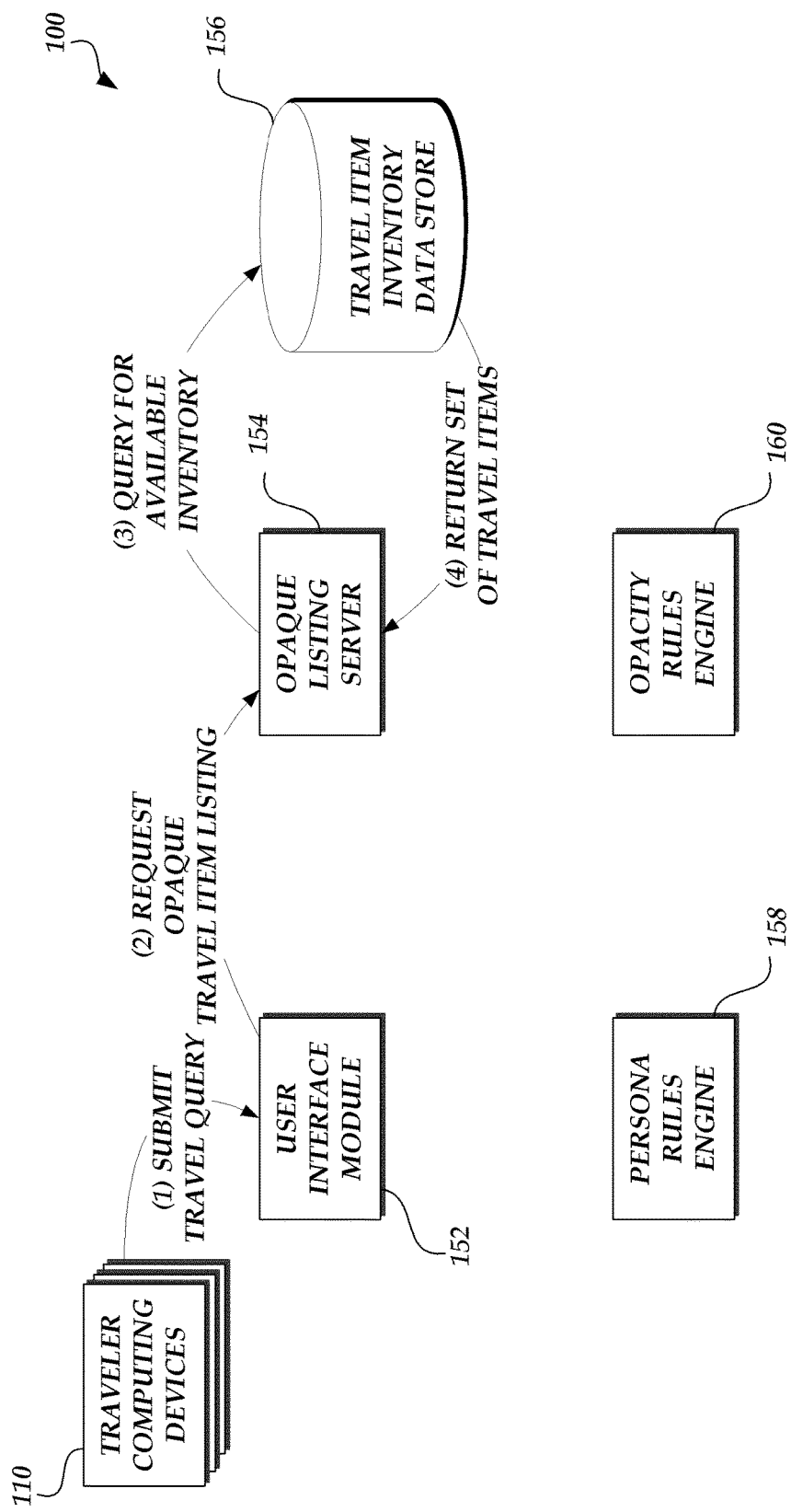
FIGS. 2A, 2B, and 2C are illustrative block diagrams depicting generation of an opaque search result based on a travel item query and a user persona, as performed by the travel service of FIG. 1.
Figure 2B:
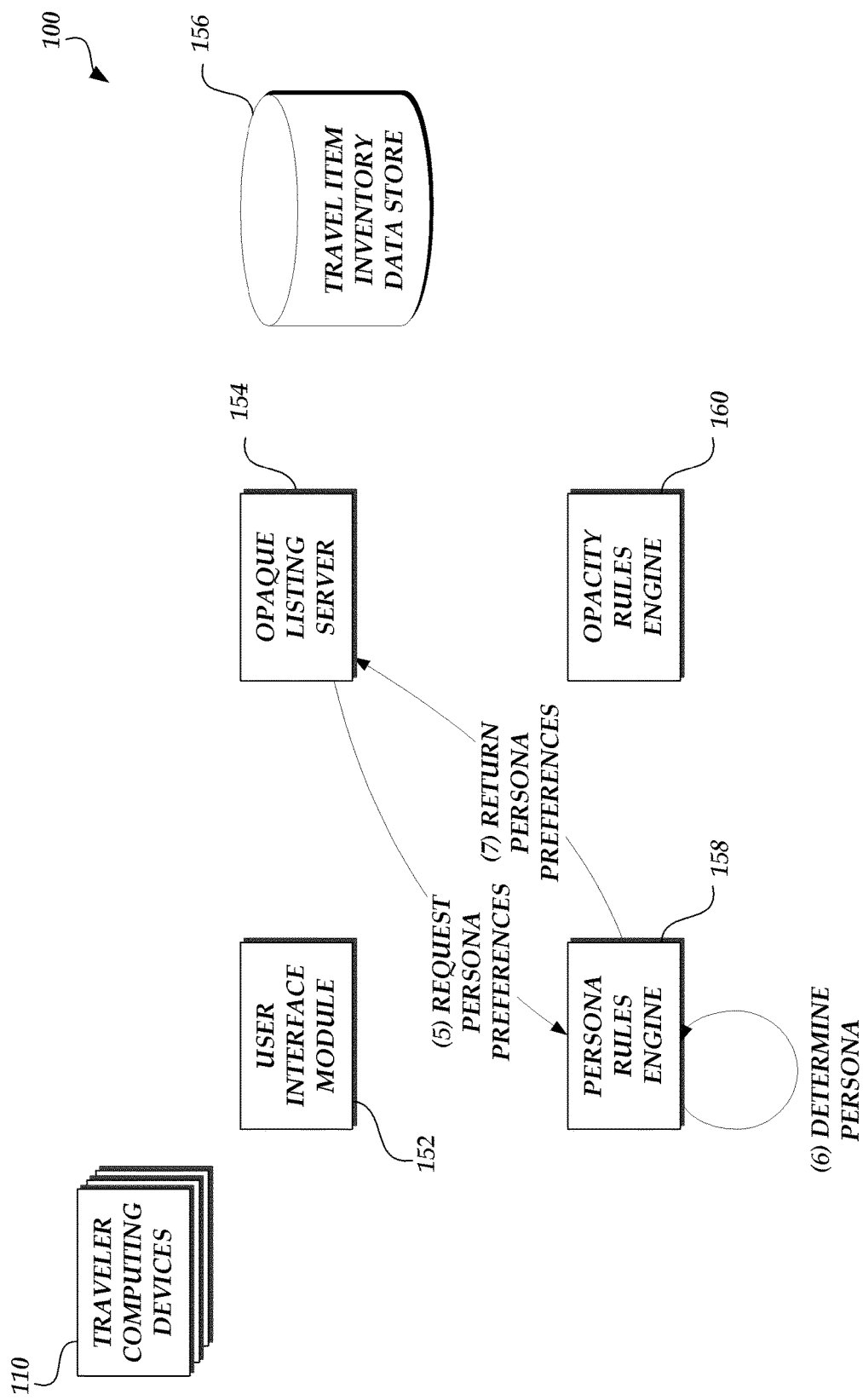
Figure 2C:
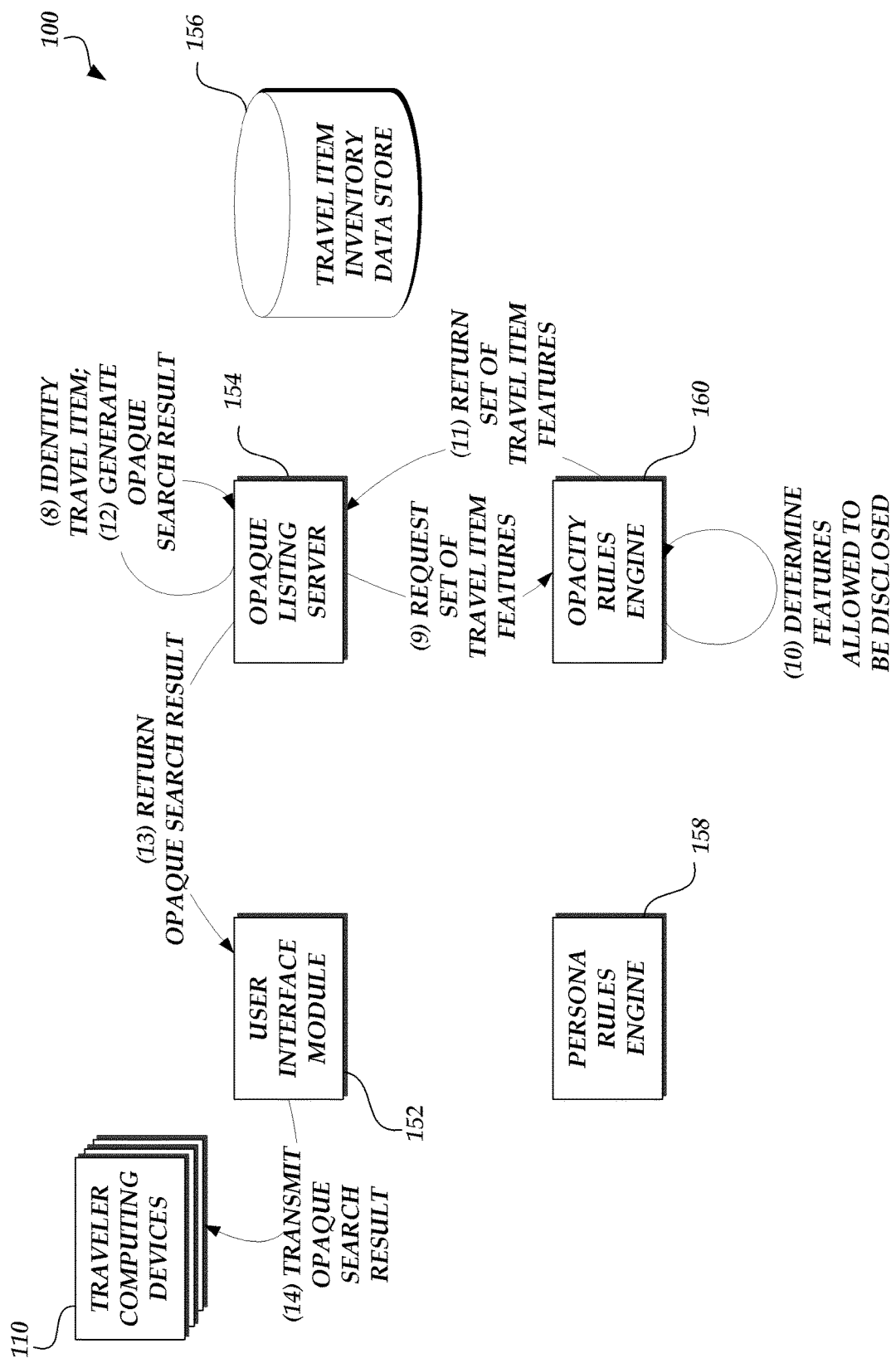

With reference now to FIGS. 2A-2C, illustrative interactions for providing opaque search results based on a travel item query and a persona will be described. Specifically, FIG. 2A depicts an illustrative interaction for submission of a search query by a traveler computing device 110 to the travel service 150, and for determination of a set of relevant travel items (e.g., to potentially be included within a listing of opaque search results) by the opaque listing server 154. FIG. 2B depicts an illustrative interaction for determination of a persona and corresponding set of persona preferences to associate with the search query. FIG. 2C depicts an illustrative interaction for generation of one or more opaque search results based on a travel item search query and the persona, and for transmission of the opaque search results to the traveler computing device 110.

With reference now to FIG. 2A, at (1), a traveler computing device 110 may submit travel queries to the travel service 150 through the user interface module 152. The travel query may include search criteria specifying one or more types of travel items desired by a traveler computing device 110, as well as desired attributes for such travel items. For example, a travel query may correspond to a query for flights, hotels, cars, cruises, travel packages, combinations thereof, etc. A travel query may further include an indication of a user persona. For example, a travel query may indicate that the user is querying for travel items associated with business travel. An indication of a user persona may be explicit (e.g., self-selected by the user) or implicit (e.g., determined by analyzing a travel history of the user that indicates past business travel). As described in more detail below with regard to FIG. 3, a travel query may indicate multiple personas, and may indicate a relative proportion for each persona. Although not shown in FIG. 2A, traveler computing devices 110 may submit travel queries via a network 120. As one skilled in the art will appreciate, the submission of travel queries by traveler computing devices 110 is illustrative and the travel service 150 may receive queries from any source. For example, an aggregator site or a travel agent operating on behalf of a user may submit queries to the travel service 150.

In accordance with embodiments of the present disclosure, the user interface module 152 may, at (2), transmit a travel query to the opaque listing server 154 and request that the opaque listing server 154 generate one or more opaque listings based on the travel query. As described above, in some embodiments, the travel query includes an explicit indication of a user persona, which the user interface module 152 transmits to the opaque listing server 154 with the search query. In other embodiments, the travel query does not include an indication of a user persona, and the user interface module 152 may request that a persona be determined and associated with the query. The user interface module 152 may further transmit user information, such as a search history or a web server log, to the opaque listing server 154 for further transmission to the persona rules engine 158, which may utilize the information to determine a persona.

After reception of the travel query by the opaque listing server 154, the opaque listing server 154 may, at (3), query the travel item inventory data store 156 for travel items that are relevant to the travel query search criteria. For example, the search criteria may specify that the user is seeking four-star hotels within a certain distance of a major airport that have rooms available on certain dates. The opaque listing server 154 may query the travel item inventory data store 156 for hotels meeting the search criteria. Subsequently, the travel item inventory data store 156 may, at (4), return a set of travel items that are relevant to the search query. Although not shown in FIG. 2A, the opaque listing server 154 may further query one or more third party inventory data stores 130 via the network 120 for travel items that are relevant to the search criteria. The third party inventory data stores 130 may return sets of travel items relevant to the search query via the network 120. The opaque listing server 154 may aggregate sets of relevant travel items received from multiple sources. Still further, as described in more detail below, the opaque listing server 154 may request that the persona rules engine 158 provide one or more geographic areas corresponding to the persona, and may utilize these geographic areas when determining relevant travel items.

With reference now to FIG. 2B, an illustrative interaction for determination of a set of persona preferences, and association of the persona preferences to the search query of FIG. 2A, will be described. The interaction of FIG. 2B may be carried out, for example, subsequent to the interaction of FIG. 2A. However, one skilled in the art will understand that the interaction of FIG. 2B may be carried out prior to, or in parallel with, the interaction of FIG. 2A. One skilled in the art will further understand that the interactions may be carried out by modules other than those illustrated. For example, in some embodiments, the user interface module 152, rather than the opaque listing server 154, may request that the persona rules engine 158 return persona preferences associated with a persona, which may include a set of weighting factors. The user interface module 152 may subsequently receive these persona preferences from the persona rules engine 158, and transmit the persona preferences to the opaque listing server 154 along with the travel item query.

In the illustrated embodiment, the opaque listing server 154 may request, at (5), that the persona rules engine 158 return persona preferences that correspond to personas associated with a user search query. The opaque listing server 154 may transmit personas associated with a user search query to the persona rules engine 158. In alternative embodiments, where a user search query is created without an explicit indication of persona, the opaque listing server 154 may transmit information that enables the persona rules engine 158 to determine personas. For example, the opaque listing server 154 may transmit a purchase history for the user that indicates past leisure travel.

The persona rules engine 158 may, at (6), determine a number of personas to associate with the travel query. As described above, the persona rules engine 158 may receive from the opaque listing server 154 one or more indicated personas. In such embodiments, the persona rules engine 158 uses the indicated personas. In other embodiments, the opaque listing server 154 may transmit information about the user submitting the query that enables the persona rules engine 158 to determine personas. Information about the user may include, for example, search histories, travel histories, web browsing behavior, a travel query, information about a queried destination or geographical area, and other relevant data. In one embodiment, the persona rules engine 158 may inspect search criteria submitted by the user to determine a persona to associate with the search query. For example, a search query for weekend accommodation at a popular resort destination, or for travel surrounding a common holiday, may result in associating a leisure persona with the search. Similarly, searches directed to weekday travel in major metropolitan areas may result in a business persona being associated with the search. In another embodiment, the persona rules engine 158 may inspect a user's travel history to determine a persona to associate with the search query. For example, if the user has previously traveled to a specific location for business purposes, future searches for travel items associated with the specific location may be more likely to be associated with a business persona.

The persona rules engine 158 may be further configured to dynamically create a persona for the current user, based at least in part on information about the user and analyses of multiple travelers. The persona rules engine 158 may analyze, for example, the travel history, web browsing history, query history, and demographics of the current user, and may identify other travelers with similar characteristics. The persona rules engine 158 may then dynamically create a persona and determine a set of weighting factors based on the activities of the other travelers. Illustratively, the persona rules engine 158 may receive information about the current user that includes a query for hotels in City A, and a travel history including hotel stays in Cities B and C. The persona rules engine 158 may identify other travelers whose travel histories include stays in the same or similar hotels in Cities B and C. The persona rules engine 158 may then dynamically create a persona for the current user based at least in part on the other travelers' hotel selections in City A.

With continued reference to FIG. 2B, at (7), the persona rules engine 158 may return to the opaque listing server 154 persona preferences that correspond to personas determined as described above. The persona preferences may be a set of weighting factors corresponding to a set of travel item attributes. For example, a set of weighting factors may be associated with a business traveler persona, and may indicate a strong positive preference for hotel amenities such as wireless internet access and proximity to a travel hub, a weak positive preference for amenities such as a fitness center, and a strong negative preference for attributes such as proximity to theme parks. In some embodiments, the persona rules engine 158 may store and maintain predetermined sets of weighting factors for personas. In other embodiments, as described above, the persona rules engine 158 may determine sets of weighting factors dynamically based at least in part on, for example, travel item purchase histories, traveler reviews, analyses of travel items and associated attributes, and data from other sources.

The persona rules engine 158 may further be configured to determine a set of weighting factors by combining a number of personas. For example, as described in more detail above, the persona rules engine 158 may determine that a user's hotel selections are consistent with a business traveler persona 80% of the time and a budget traveler persona 20% of the time. The persona rules engine 158 may therefore apply a linear weighting algorithm, for example an 0.80 multiplier to the business persona weighting factors and an 0.20 multiplier to the budget persona weighting factors, to combine them into a single set. As a further example, in some embodiments, the persona rules engine 158 may combine sets of weighting factors by determining the unions or intersections of the sets.

In a further embodiment, the persona rules engine 158 may determine and return persona preferences that correspond to one or more geographic areas. For example, the persona rules engine 158 may determine that a business travel persona corresponds to an interest in hotels near a convention center, hotels near an airport, and hotels near a business district. As a further example, the persona rules engine 158 may determine that a leisure travel persona corresponds to an interest in hotels near a theme park, hotels near the ocean, and hotels near a shopping district. Like the weighting factors, the persona rules engine 158 may store predetermined sets of geographic areas for personas, or in other embodiments may determine geographic areas dynamically based at least in part on traveler information.

With reference now to FIG. 2C, an illustrative interaction for generation of opaque search results, based on the relevant travel items, user personas, and a disclosable set of travel item attributes, will be described. In some embodiments, the opaque listing server 154, at (8), may identify one or more travel items that may form the basis of one or more opaque search results. The opaque listing server 154 may utilize a set of weighting factors received from the persona rules engine 158 to identify travel items that are relevant to a persona. Illustratively, the opaque listing server 154 may use weighting factors to generate a score for each travel item, may rank order the travel items, and may identify the highest-scoring item or items. For example, the set of weighting factors for accommodation attributes for a family vacation persona may be as follows: swimming pool, 9.0; spa, 8.0; proximity to tourist attractions, 10.0; fitness center, 6.5; free breakfast, 7.0; free parking, 8.5; business center, 5.0; proximity to business districts, 1.0. The opaque listing server 154 may sum the weighting factors for Hotel A, which has a fitness center and free parking, and determine a score of 15.0. The opaque listing server 154 may further determine a score of 27.0 for Hotel B, which has a swimming pool, a spa, and is located near a museum, and a score of 6.0 for Hotel C, which has a business center and is located near a business district. The opaque listing server 154 may therefore identify Hotel B as the travel item most relevant to the persona. As one skilled in the art will appreciate, the opaque listing server 154 may use any combination of weighting factors and mathematical formulas to identify the travel item or items including attributes that correlate with the preferences of a persona.

The opaque listing server 154 may further identify a different set of travel items without utilizing a set of weighting factors received from the persona rules engine 158. Still further, the opaque listing server 154 may request and receive additional sets of weighting factors from the persona rules engine 158, and may further identify travel items based on these weighting factors. The opaque listing server 154 may further apply combinations, unions, or intersections of weighting factors to identify travel items, and may apply weighting factors in proportion to the relevance of the associated personas.

After identifying a travel item or items, the opaque listing server 154 may, at (9), request that the opacity rules engine 160 return a set of travel item attributes that can be disclosed without revealing the identity of the travel item supplier. The opaque listing server 154 may transmit one or more identified travel items with the request. In some embodiments, the opacity rules engine 160, at (10), may determine a set of disclosable attributes for each identified travel item. In other embodiments, the opacity rules engine 160, at (10), may determine a set of disclosable attributes applicable to all identified travel items. The opacity rules engine 160 may be configured to store a predetermined disclosable attribute set for each travel item in the travel item inventory data store 156. Alternatively, the opacity rules engine 160 may be configured to dynamically determine a disclosable attribute set for a travel item. The opacity rules engine 160 may base its determination on the set of travel items in the travel item inventory data store 156, on a set of travel items aggregated by the opaque listing server 154, or on one or more travel items identified by the opaque listing server 154 as relevant to a persona. The opacity rules engine 160 may further base its determination on the geographic areas returned by the persona rules engine 158.

Illustratively, the opaque listing server 154 may request that the opacity rules engine 160 determine a disclosable set of travel item attributes associated with Hotel X, which the opaque listing server 154 has identified as relevant to a persona. Hotel X illustratively provides amenities including a fitness center, wireless internet access, free parking, and a swimming pool. The opacity rules engine 160 may be configured, for example, to store a determination that the fitness center and swimming pool of Hotel X may be disclosed without revealing the identity of Hotel X. The opacity rules engine 160 therefore determines that the disclosable set of attributes is the fitness center and the swimming pool. Although not shown in FIG. 2C, in some embodiments, the opacity rules engine may query the travel item inventory data store 156 for hotels similar to Hotel X, and may determine a disclosable set of attributes based at least in part on the similar hotels. For example, the opacity rules engine 160 may query the travel item inventory data store 156 and receive Hotels Y and Z, which are in the same geographic area as Hotel X and have the same quality of service (e.g., they are all three-star hotels). Hotel Y, in this example, has a fitness center, a swimming pool, and free parking. Hotel Z illustratively has a fitness center, free parking, and a business center. The opacity rules engine 160 may determine, based at least in part on the attributes of these three hotels, that the disclosable set of attributes is a fitness center and free parking. Alternatively, the opacity rules engine 160 may determine that the disclosable set of attributes is a fitness center, a swimming pool, and free parking, which reveals that the travel item is not Hotel Z (because Hotel Z does not have a swimming pool) but does not reveal whether the item is Hotel X or Hotel Y.

In further embodiments, the opaque listing server 154 transmits a set of travel items to the opacity rules engine 160. The set may include travel items that the opaque listing server 154 has identified as relevant to a travel item query. The set may further include travel items that the opaque listing server 154 has not so identified. The opacity rules engine 160 may determine a set of disclosable attributes based at least in part on the set of travel items transmitted by the opaque listing server 154. Illustratively, the opaque travel item server may query the travel item inventory data store 156 for relevant travel items and receive Hotels J, K, and L. The opaque travel item server may then determine, as described above, that Hotel J is relevant to a travel item query. The opaque listing server 154 may then transmit Hotels J, K, and L to the opacity rules engine 160 with a request that the rules engine 160 determine a disclosable set of attributes for Hotel J. The opacity rules engine may determine the disclosable attributes of Hotel J based at least in part on the attributes of Hotels J, K, and L.

After determining which attributes of a travel item can be disclosed without revealing the identity of the travel item supplier, the opacity rules engine 160 may, at (11), return the determined set of travel item attributes. The rules engine 160 may indicate that certain attributes may be disclosed without revealing the supplier identity, and that other attributes may not be disclosed. The opacity rules engine 160 may further indicate that certain attributes will always be disclosed, such as the quality of service (e.g., whether the travel item is a three-star hotel or a four-star hotel), or may exclude attributes from its determination when the attributes in question will always be disclosed or will never be disclosed. Still further, the rules engine 160 may indicate a degree of risk associated with disclosing a particular attribute or attributes. For example, the opacity rules engine 160 may determine that Hotel J is one of three possible suppliers of a four-star hotel in a particular geographic area with a business center. Accordingly, the opacity rules engine 160 may indicate that disclosing the quality of service, the geographic area, and the business center would reduce the list of potential suppliers to three candidates, but would not (by itself) allow the user to identify the supplier.

Thereafter, the opaque listing server 154, at (12), may generate one or more opaque search results. The opaque listing server 154 may generate an opaque search result based at least in part on an identified travel item and a corresponding set of disclosable attributes returned by the opacity rules engine 160. Further, the opaque listing server 154 may generate an opaque search result based at least in part on a set of persona weighting factors returned by the persona rules engine 158. Illustratively, the opaque listing server 154 may generate an opaque search result based on Hotel J. As described above, the opaque listing server 154 may request and receive a set of weighting factors associated with a persona from the persona rules engine 158, and may further request and receive a set of disclosable attributes corresponding to Hotel J from the opacity rules engine 160. Illustratively, the weighting factors may indicate that proximity to a tourist attraction is of high importance to a leisure traveler persona, and that a business center is of low importance. Further, the set of disclosable Hotel J attributes may include a spa, proximity to a tourist attraction, a business center, wireless internet access, and that it is a three-star hotel. Accordingly, the opaque listing server 154 may generate an opaque search result that discloses the following information: there is an available three-star hotel with a spa that is located in proximity to a tourist attraction.

In accordance with embodiments of the present disclosure, the opaque listing server 154 may generate multiple opaque search results based at least in part on a single travel item. For example, the opaque listing server 154 may generate a second opaque search result based on the Hotel J of the example above: there is an available three-star hotel with a business center and wireless internet access. Illustratively, the opaque listing server 154 may generate the second opaque search result based at least in part on a different persona than the first. Further, the opaque listing server 154 may generate opaque search results that are not based on a persona. The opaque listing server 154 may group these opaque search results into sets, and may associate the sets with personas.

In some embodiments, the opaque listing server 154 may determine a price for each generated opaque search result. The price may be based at least in part on the persona and the disclosed set of attributes. For example, the opaque listing server 154 may price the first opaque search result based on Hotel J at $119, and may price the second opaque hotel result based on Hotel J at $129, based on the attributes disclosed and their relative importance to the corresponding personas. The opaque listing server 154 may further combine the determination of a set of attributes to disclose and the price for an opaque search result, both based at least in part on a user persona. Illustratively, the opaque listing server 154 may determine a business traveler persona would prefer a hotel with a fitness center. The opaque listing server 154 may therefore determine a higher price for an opaque search result that discloses a fitness center, as compared to an opaque search result that does not disclose a fitness center.

In some embodiments, the opaque listing server 154, at (13), may be configured to then return an opaque search result to the user interface module 152. The opaque listing server 154 may be further configured to return multiple opaque search results, and may still further group opaque search results into sets. The user interface module 152 may then, at (14), be configured to transmit these opaque search results to traveler computing devices 110. Although FIG. 2C illustrates a particular embodiment, one skilled in the art will appreciate that embodiments of the present disclosure include multiple interactions for outputting opaque travel item search results. In some embodiments, the opaque listing server 154 may transmit opaque search results to, for example, traveler computing devices 110, a travel item search result aggregator, a travel agent operating on behalf of a user, a data store, etc.

Figure 3A:
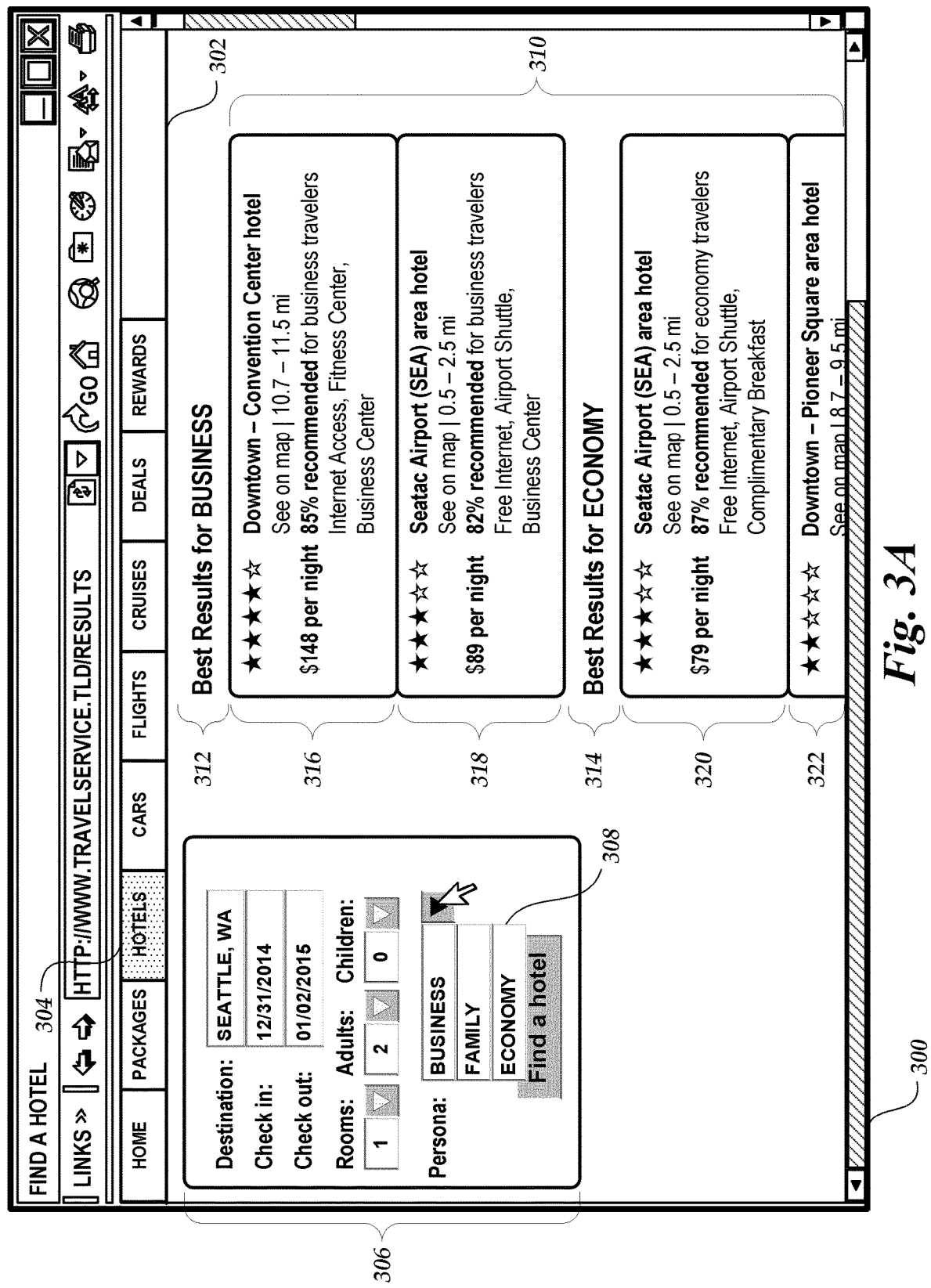
FIGS. 3A and 3B depict illustrative user interfaces that may be used to facilitate submission of a travel item query to, and delivery of an opaque search result from, the travel service of FIG. 1.
Figure 3B:
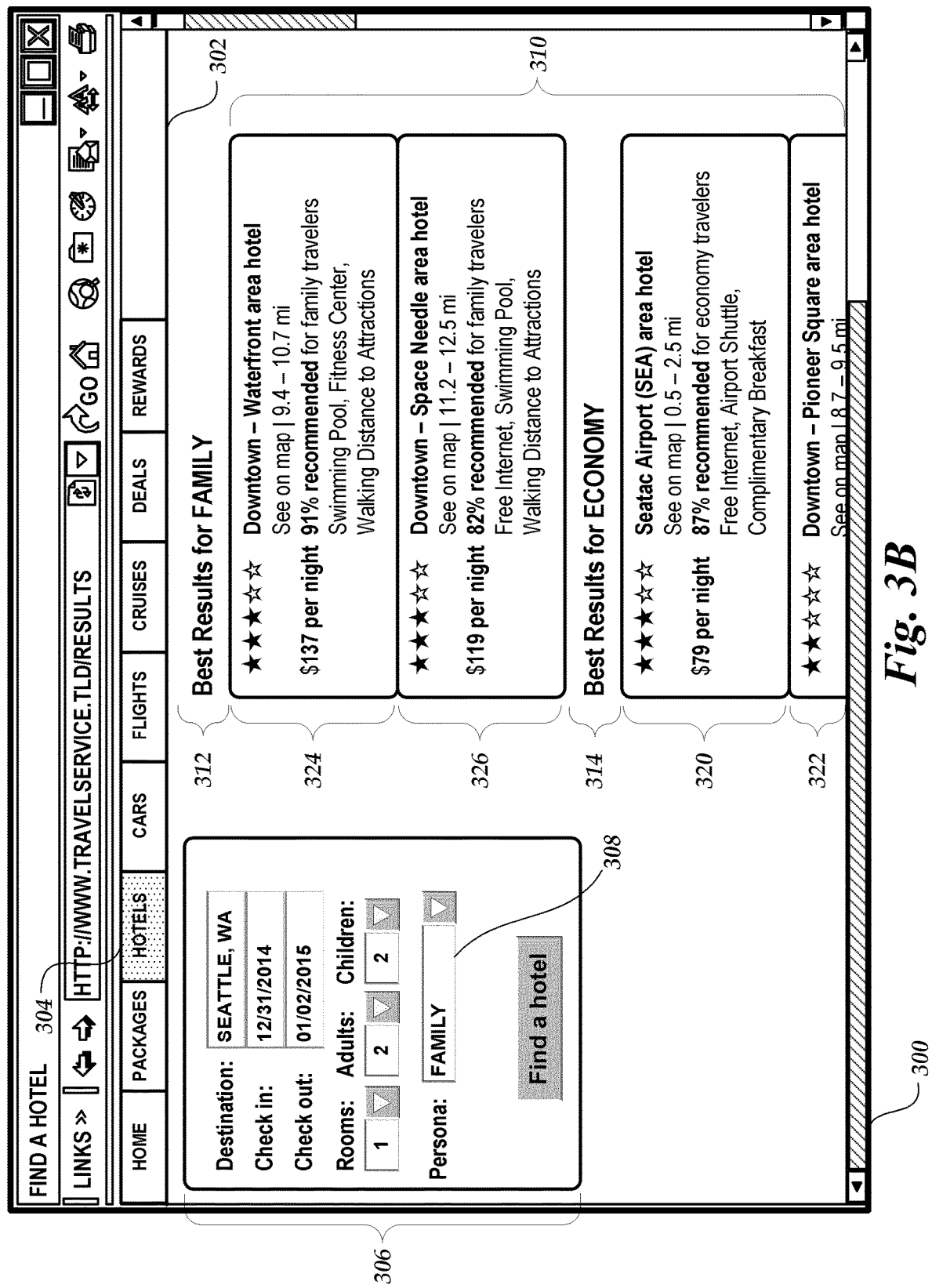

With reference now to FIGS. 3A and 3B, an example of a user interface 300 for delivery of opaque search results to a traveler computing device 110 (e.g., in response to a travel item query) is displayed. As shown in FIG. 3A, the user interface 300 enables a traveler computing device 110 to submit travel item queries, to view opaque search results in response to a submitted travel item query, and to reserve, book, acquire, or purchase a travel item that corresponds to an opaque search result. Illustratively, the user interface 300 may be generated by the user interface module 152 and presented on the traveler computing device 110 by an application, such as a web browser application, on the traveler computing device 110. In this example, the user interface 300 contains a navigation panel 302, which directs the user to various other attributes offered by the travel service 150. Illustratively, units of text within the navigation panel 302 may correspond to interactive links, which modify or change the user interface when selected. In the current example, the user has selected link 304, "Hotels." Based on this selection, the user interface module 152 has returned the content for user interface 300.

By use of the user interface 300, the traveler computing device 110 may submit a travel query to the travel service 150, including criteria for determining relevant travel items. Illustratively, such a query may be submitted by use of the search portion 306 of the user interface 300. As shown in FIG. 3A, the search portion 306 enables a user to specify criteria for relevant hotel travel items, such as a destination, check-in and check-out dates, and the number of rooms, adults, and children. Though a limited set of search criteria is provided in FIG. 3A, one skilled in the art will appreciate that additional or alternative criteria may be specified by the traveler computing device 110. Accordingly, the criteria described with respect to FIG. 3A is intended to be illustrative, and not limiting.

The search portion 306 of the user interface 300, as shown in FIG. 3A, further enables a user, via the drop-down menu 308, to select a persona for the search query. In the illustrative user interface 300, the criteria displayed in the search portion 306 may be reflective of a previous search submitted by the traveler computing device 110. Accordingly, a number of relevant opaque search results are shown within the results portion 310, including opaque search results 316-322. Each opaque search result 316-322 corresponds to a travel item available for acquisition by the user. Further, each opaque search result may have been selected based on the submitted search criteria. In the current example, each opaque search result 316-322 corresponds to a hotel in Seattle, Wash. with a room available for check-in on Dec. 31, 2014 and check-out on Jan. 2, 2015. One skilled in the art will appreciate that any number of common user interface controls may be presented to enable the user to select one or more personas. For example, the user interface 300 may present a set of checkboxes for selecting personas, thereby enabling the user to indicate multiple personas in the search query. As a further example, the user interface 300 may present a set of sliders that allow the user to indicate, e.g., that the search should be biased 75% toward a business persona and 25% toward an economy persona. The user interface 300 may further enable the user to dynamically adjust these controls and receive updated opaque search results.

With continued reference to FIG. 3A, the opaque search results 316-322 are illustratively grouped into sets, as reflected by the subheadings 312 and 314. Heading 312 indicates that opaque search results 316 and 318 have been selected based on a business traveler persona. Heading 314 indicates that opaque search results 320 and 322 have been selected based on an economy traveler persona. As described above, in some embodiments, sets of opaque search results may be identified based on different personas. Illustratively, the user interface 300 may display opaque search results for a selected persona and a default persona. In FIG. 3A, the selected persona and the default persona correspond to a business traveler persona and an economy traveler persona, respectively.

Opaque search result 316 illustrates a hotel that has been identified as relevant to a business traveler persona. The search result 316 does not identify the hotel by name, and does not disclose enough information to allow the user to identify the supplier, but does disclose a set of attributes relevant to business travelers. The opaque search result 316 thus allows the user to evaluate whether the travel item meets his or her travel requirements. Illustratively, opaque search result 316 discloses a set of positive ratings by business travelers, and a set of travel item attributes that are desirable for business travelers, including proximity to a convention center, internet access, a fitness center, and a business center.

Opaque search result 318 illustrates a second hotel identified as relevant to a business traveler persona. Illustratively, in FIG. 3A, results 316 and 318 are listed in order as the top results most relevant to a business traveler persona. Opaque search result 318 is based on a hotel near Sea-Tac Airport, has some attributes relevant to business travelers, and has been priced at $89 per night. Opaque search result 320, the top result for economy travelers, is based on the same hotel. As described above, multiple opaque search results may be generated, priced, and displayed based on the same travel item. Opaque search result 320 discloses a different set of attributes than opaque search result 318, which is reflective of a different set of weighting factors. The price of opaque search result 320 reflects a determination that economy travelers are price sensitive, and are unlikely to pay a higher rate in order to guarantee that additional attributes (such as, e.g., a business center) will be available. Opaque search result 322, which is partially shown in FIG. 3A, is the travel item that was second-best on the list of items relevant to an economy traveler persona.

In alternatives to the embodiment illustrated in FIG. 3A, the weighting factors of multiple personas may be combined to identify relevant search results, as described in more detail above. In these embodiments, subheadings 312 and 314 may be omitted and a single list of relevant opaque search results may be provided. For example, a list of opaque search results may include hotels that are highly relevant to a business traveler and leisure traveler persona combined in an 80:20 proportion, as described above with reference to FIG. 2B.

With reference now to FIG. 3B, a modified version of the user interface 300 of FIG. 3A will be described. Because many display elements of FIG. 3B are similar to those of FIG. 3A, they will not be described in detail with respect to FIG. 3B.

In one embodiment, the user interface 300 of FIG. 3B may be displayed in response to selection of a "family" persona from the drop-down menu 308 of FIG. 3A. Accordingly, the user interface 300 of FIG. 3B may be modified to display opaque search results that are relevant to a family traveler persona. This may be reflected in the modified header 312, as well as in the opaque search results 324 and 326. Specifically, opaque search results 324 and 326 have replaced opaque search results 316 and 318 of FIG. 3A. Opaque search results 324 and 326 now reflect the top search results identified for a family traveler persona. Opaque search result 324 discloses a hotel near the waterfront with a swimming pool, fitness center, and within walking distance of tourist attractions. Opaque search result 326 discloses a hotel near a major tourist attraction (the Space Needle) with free internet, a swimming pool, and within walking distance of other tourist attractions. These opaque search results reflect the different weighting factors associated with the family traveler persona, which illustratively place a high importance on accommodations within walking distance of tourist attractions and value a different set of reviewers when evaluating traveler reviews. Illustratively, the user interface 300 of FIG. 3B continues to display heading 314 and opaque search results 320 and 322, which are the top results for an economy traveler persona.

Though an illustrative user interface 300 is described above with respect to FIGS. 3A-3B, opaque search results may be provided to a user via any number of or type of interfaces. For example, the user interface 300 may display two or more of the most recently selected personas (e.g., the family and business personas) rather than the most recently selected persona and a default persona. Still further, in some embodiments, results may be displayed in multiple columns, with selectable tabs or buttons, or via other user interface elements that are commonly known to those skilled in the art. Accordingly, the user interface 300 of FIGS. 3A-3B should be viewed as illustrative, and not limiting.

Figure 4:
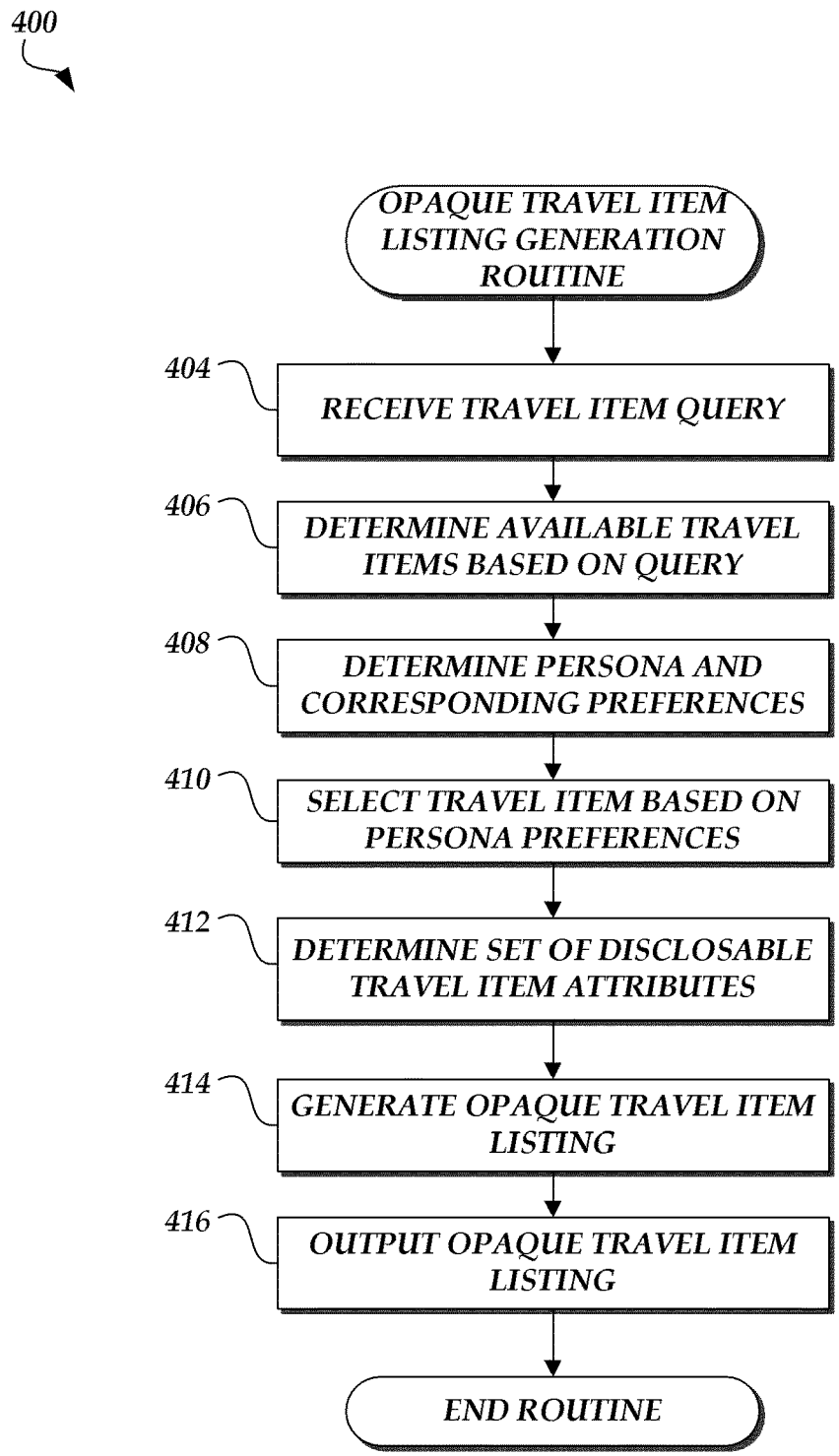
FIG. 4 is a flow diagram depicting an illustrative routine for associating a user persona with a travel item query and generating opaque search results based on the query and the persona.

With reference now to FIG. 4, one illustrative routine 400 for generation of opaque travel item listings based on a user persona will be described. The illustrative routine 400 may be carried out, for example, by the opaque listing server 154 of FIG. 1. In some embodiments, blocks of the illustrative routine 400 may be carried out by the persona rules engine 158 of FIG. 1, or by the opacity rules engine 160 of FIG. 1.

At block 404, a travel item query may be received (e.g., from the traveler computing devices 110 of FIG. 1, via the network 120 and, in some embodiments, further via the user interface module 152 of FIG. 1). For example, a travel item query may be received including criteria that specify a three-night stay for one adult at a three-star hotel in City A on a given date. A travel item query may contain an indication of a user persona, such as a business traveler or a leisure traveler. Further, a travel item query may contain information that enables determination of a user persona, such as query histories or web browsing behavior.

Thereafter, at block 406, one or more available travel items may be determined based on the travel item query. As described above, available travel items may correspond to criteria in the travel item query. For example, the available travel items may include six three-star hotels in City A that have rooms available on the specified date. Illustratively, for queries regarding accommodations, the available travel items may include information about hotel attributes such as amenities and proximity to local points of interest. The available travel items may further include, for example, traveler ratings, pricing, room types, location within a specified region, or other such information. As a further example, with respect to flight queries, the available travel items may include information about attributes such as available seat classes, in-flight entertainment, meal service, wireless internet access, electrical outlets, and similar attributes. Based on the travel item query, only those available travel items matching one or more of the search criteria may be determined.

At block 408, the illustrative routine 400 may determine a user persona and a corresponding set of persona preferences. As one skilled in the art will recognize, block 408 does not depend on block 406 and the two blocks may be carried out in any order. In some embodiments, as described above, the travel item query may indicate a user persona, in which case the corresponding preferences may be determined. In other embodiments, a persona may be determined indirectly. Illustratively, the illustrative routine 400 may analyze web server logs to determine that a user is browsing resort hotels, and determine that a vacationer persona should be associated with the travel item query. In further embodiments, as described above, more than one persona may be determined. Block 408 may be carried out, for example, in whole or in part by the persona rules engine 158 of FIG. 1.

Thereafter, at block 410, the travel item query and the list of available travel items may be used to identify relevant travel items. The persona preferences may further be used to identify travel items most relevant to a user persona. Illustratively, after retrieving six available three-star hotels in block 406 and determining a vacationer persona in block 408, the illustrative routine 400 in block 410 may identify one particular hotel as having attributes most relevant to a vacationer, such as a spa and proximity to a golf course. In some embodiments, block 410 may correspond to the opaque listing server 154 identifying sets of travel items that are relevant to various personas, as described above.

At block 412, a set of disclosable travel item attributes, for inclusion in an opaque travel item listing, may be determined for a specified travel item. In several embodiments, block 412 may be carried out after the identification of relevant travel items at block 410, and may further involve a dynamic determination based on the travel items identified. In other embodiments, as discussed above, block 412 may be carried out using a predetermined set of disclosable attributes for each travel item, and in these embodiments, the illustrative routine 400 may carry out blocks 410 and 412 in any order. Illustratively, it may be determined that the disclosable attribute set for a relevant travel item includes a spa, a fitness center, and proximity to a golf course. The disclosable attribute set may be determined based on the attributes of similar travel items, and may be determined such that the disclosed attribute set does not specifically identify the supplier of a travel item. For example, there may be at least two three-star hotels in a given area with a spa, business center, and proximity to a golf course. Accordingly, disclosing these attributes will not reveal the identity of the supplier, and therefore the illustrative routine 400 at block 412 will determine a disclosable attribute set including these attributes. Further, the disclosable attribute set may be determined based on geographic areas associated with a persona. Block 412 may be carried out, for example, in whole or in part by the opacity rules engine 160 of FIG. 1.

Thereafter, at block 414, an opaque travel item listing may be generated. The generation of an opaque listing may be based on a relevant travel item, as identified at block 410. Generating an opaque listing may further be based on the list of disclosable attributes determined at block 412, and may determine which of the disclosable attributes will actually be disclosed. Still further, generating an opaque listing may be based on the persona preferences determined at block 408. For example, the illustrative routine 400 may generate an opaque listing based on a three-star hotel identified as relevant to a vacationer persona, and may disclose that the hotel has a spa and is located near a golf course. The generation of an opaque listing may include generation of a price associated with the opaque listing. The price may, in some embodiments, be based on the set of disclosed attributes. In still further embodiments, the price may be based on the persona preferences.

Thereafter, at block 416, an opaque travel item listing may be output. Illustratively, the search result may be output to a traveler computing device 110 via a network 120, as shown in FIG. 1. In some embodiments, the search result may be output to a travel item aggregator, a data store, a web server, or other device. Block 416 of illustrative routine 400 may be carried out by, for example, a user interface module 152 as shown in FIG. 1.

Many of the operations of the travel service 150 are sufficiently mathematically or technically complex that one or more computing devices may be necessary to carry them out. For example, determining a set of persona preferences, identifying a set of available travel items, selecting the travel item most relevant to the persona, determining a set of disclosable travel item attributes, and other operations of the travel service 150 effectively require resort to one or more computing devices. Additionally, a computing device may be required to present an opaque travel item, as discussed above.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
 a data store configured to store information identifying a plurality of travel items, each travel item having a plurality of attributes; and
 a processor in communication with the data store, the processor configured with executable instructions that, when executed by the processor, cause the system to at least:
  receive, from a user computing device, a query including criteria for identifying, within the plurality of travel items, a travel item responsive to the query, wherein the query is associated with a type of intended travel;
  identify, from the data store, the travel item responsive to the query;
  determine, based at least in part on the type of intended travel, a disclosable set of attributes for the travel item, wherein the disclosable set of attributes includes less than all attributes for the travel item, and wherein the disclosable set of attributes excludes an identity of a supplier of the travel item; and cause the user computing device to display search results responsive to the query in a format that includes the disclosable set of attributes for the travel item and excludes the identity of the supplier.

2. The system of claim 1, wherein the disclosable set of attributes is determined based at least in part on attributes of travel items acquired by individual travelers associated with the type of intended travel.

3. The system of claim 1, wherein the processor is further configured to associate a second type of intended travel with the query.

4. The system of claim 3, wherein the travel item responsive to the query is identified based at least in part on the second type of intended travel.

5. The system of claim 1, wherein the processor is configured to identify the type of intended travel.

6. The system of claim 5, wherein the type of intended travel is identified based at least in part on one or more of the query, the user, a set of preferences associated with the user, a previous query associated with the user, a web browsing history associated with the user, or a travel history associated with the user.

7. The system of claim 1, wherein the processor is configured to generate a set of weighting factors associated with the type of intended travel.

8. A computer-implemented method comprising:
as implemented by one or more computing devices configured with specific executable instructions,
receiving, from a user, a request for travel item listings;
obtaining a travel item based at least in part on the request;
determining, based at least in part on a type of intended travel associated with the request, a disclosable set of attributes for the travel item, wherein the disclosable set of attributes includes less than all attributes for the travel item, and wherein the disclosable set of attributes is associated with at least one other travel item; and
transmitting, responsive to the request, an travel item listing corresponding to the travel item, wherein the travel item listing includes the disclosable set of attributes and excludes an identity of a supplier of the travel item, and wherein transmitting the travel item listing causes a computing device associated with the user to display the disclosable set of attributes for the travel item without displaying the identity of the supplier of the travel item.

9. The computer-implemented method of claim 8, wherein obtaining the type of intended travel comprises:
identifying, based at least in part on at least one of the request or the user, a first set of previous travelers; and
determining the type of intended travel based at least in part on the first set of previous travelers.

10. The computer-implemented method of claim 9, wherein the first set of previous travelers is identified based at least in part on one or more of a destination associated with the request, a check-in date, a check-out date, a number of travelers associated with the request, or the ages of one or more travelers associated with the request.

11. The computer-implemented method of claim 9, wherein the first set of previous travelers is identified based at least in part on at least one of a travel history of the user, a browsing history of the user, or a preference of the user.

12. The computer-implemented method of claim 8, wherein obtaining the type of intended travel comprises selecting the type of intended travel from a plurality of types of intended travel.

13. The computer-implemented method of claim 8, wherein obtaining the type of intended travel comprises:
selecting a plurality of types of intended travel; and
combining the plurality of types of intended travel to produce the type of intended travel.

14. The computer-implemented method of claim 13, wherein combining the plurality of types of intended travel is based at least in part on a linear weighting algorithm.

15. The computer-implemented method of claim 13, wherein combining the plurality of types of intended travel is based at least in part on determining a union or intersection of the plurality of types of intended travel.

16. Non-transitory computer-readable storage media having computer-executable instructions that, when executed by a computing system, cause the computing system to at least:
determine, based at least in part on an activity of a user, a query for search results identifying attributes of one or more travel items available for acquisition without identifying suppliers of the one or more travel items;
identify a travel item based at least in part on the query and a type of intended travel attributable to the query;
determine, based at least in part on the type of intended travel, a set of disclosable attributes for the travel item, wherein the set of disclosable attributes excludes an identity of the supplier of the travel item; and
cause a computing device associated with the user to display a search result based at least in part on the travel item, wherein the search result includes the set of disclosable attributes and excludes the identity of the supplier of the travel item.

17. The non-transitory computer-readable storage medium of claim 16, wherein the set of disclosable attributes is determined based at least in part on an inventory of travel items.

18. The non-transitory computer-readable storage medium of claim 16, wherein the type of intended travel is obtained from a set of types of intended travel.

19. The non-transitory computer-readable storage medium of claim 16 wherein the media further includes instructions that, when executed by the computing system, cause the computing system to at least identify, based at least in part on the activity of the user, at least one set of previous travelers.

20. The non-transitory computer-readable storage medium of claim 19, wherein the type of intended travel is determined based at least in part on the at least one set of previous travelers.

* * * * *